(12) United States Patent
Ishida et al.

(10) Patent No.: US 7,558,931 B2
(45) Date of Patent: Jul. 7, 2009

(54) WRITE/READ APPARATUS TO CONTROL OVERWRITING

(75) Inventors: Yoshiteru Ishida, Kanagawa (JP); Hitoshi Ogawa, Kanagawa (JP); Atsushi Saito, Kanagawa (JP); Terumi Takashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 319 days.

(21) Appl. No.: 11/228,776

(22) Filed: Sep. 16, 2005

(65) Prior Publication Data

US 2006/0069845 A1    Mar. 30, 2006

(30) Foreign Application Priority Data

Sep. 29, 2004    (JP)    ............................. 2004-283597

(51) Int. Cl.
*G06F 12/00* (2006.01)
*G06F 12/16* (2006.01)

(52) U.S. Cl. ............................. 711/163; 711/112; 711/4
(58) Field of Classification Search ................. 711/163, 711/4, 112
See application file for complete search history.

(56) References Cited

U.S. PATENT DOCUMENTS

| | | | | |
|---|---|---|---|---|
| 5,317,713 A | * | 5/1994 | Glassburn | .................... 711/113 |
| 5,982,418 A | * | 11/1999 | Ely | ............................. 348/153 |
| 6,324,654 B1 | * | 11/2001 | Wahl et al. | ...................... 714/6 |
| 6,330,648 B1 | * | 12/2001 | Wambach et al. | ........... 711/163 |
| 2001/0038704 A1 | * | 11/2001 | Ito et al. | ...................... 382/100 |
| 2001/0041046 A1 | * | 11/2001 | Wada | ............................ 386/46 |
| 2004/0036997 A1 | * | 2/2004 | Hetzler et al. | ............. 360/78.04 |
| 2005/0015563 A1 | * | 1/2005 | Yang et al. | ................... 711/170 |
| 2005/0058428 A1 | * | 3/2005 | Choi | ............................. 386/46 |
| 2005/0078395 A1 | * | 4/2005 | Chu et al. | ...................... 360/48 |

FOREIGN PATENT DOCUMENTS

| | | |
|---|---|---|
| JP | 2000-149425 | 5/2000 |
| JP | 2002-133770 A | 5/2002 |
| JP | 2002-140171 A | 5/2002 |
| JP | 2002-251324 A | 9/2002 |
| JP | 2002-367341 | 12/2002 |

* cited by examiner

*Primary Examiner*—Shane M Thomas
(74) *Attorney, Agent, or Firm*—Townsend and Townsend and Crew LLP; Patrick Duncan (57) ABSTRACT

In one embodiment, a write/read apparatus includes an external interface section for data input; an external interface section for data output; a memory for temporarily storing the data that is input through the external interface section for data input and written on the recording medium and the data that is read from the recording medium and sent to the outside through the external interface section for data output; an address generating section for generating unique addresses associated with physical block addresses of the recording medium; a flag generating section for generating flags for prohibiting overwriting of the data to be written on the recording medium; and a processing section for adding the unique addresses generated in the address generating section to the data that is stored in the memory and that is to be written on the recording medium. The data with the addition of the flags generated in the flag generating section and the unique addresses is written on the recording medium.

11 Claims, 4 Drawing Sheets

Flag management table (a)

| PBA | 31 | 30 | ... | 7 | 6 | 5 | 4 | 3 | 2 | 1 | 0 |
|---|---|---|---|---|---|---|---|---|---|---|---|
| 0000h | 0 | 0 | ... | 0 | 0 | 0 | 0 | 0 | 0 | 0 | 0 |
| 0020h | 0 | 0 | ... | 0 | 1 | 1 | 1 | 1 | 1 | 0 | 0 |
| : | : | : | ... | : | : | : | : | : | : | : | : |
| XXXXh | 0 | 0 | ... | 0 | 0 | 0 | 0 | 0 | 0 | 0 | 0 |

(b)

| PBA | Length |
|---|---|
| 0022h | 5 |
| : | : |
| : | : |
|  |  |

WRITE/READ APPARATUS TO CONTROL OVERWRITING

CROSS-REFERENCES TO RELATED APPLICATIONS

This application claims priority from Japanese Patent Application No. JP2004-283597, filed Sep. 29, 2004, the entire disclosure of which is incorporated herein by reference.

BACKGROUND OF THE INVENTION

The present invention relates to a write/read apparatus having a rotating recording medium and, in particular, it relates to control of write/read of data stored in the write/read apparatus.

In recent years, it is known to capture passersby and other objects by a surveillance camera placed at a desired position, indoors and outdoors, and record surveillance data such as captured video and sound in a write apparatus in chronological order. The recorded surveillance data is used, for example, for criminal investigation. Typically, media such as a tape and an optical disk are used for recording the surveillance data. In the case of the tape medium, a host system writes and reads the input surveillance data by sequential access. On the other hand, in the case of the optical disk medium, physical block addresses (PBAs) are written on the optical disk in advance and the host system writes the input surveillance data in a sequential or overwrite manner and reads the data randomly by specifying logical block addresses (LBAs).

Further, recently, a write/read apparatus for surveillance data such as a server, a personal computer (PC) and a digital video recorder (DVR) provided with a magnetic disk drive internally or externally becomes in use in order to write and read the surveillance data for a long time with improved image quality and operability. The magnetic disk drive has a general-purpose interface port such as ATA (AT attachment) or SCSI (small computer system interface) and writes and reads the data according to LBA specified by the host system having a file system.

In connection with a technique for writing video data on an optical disk, for example, Japanese Patent Laid-open No. 2002-367341 (Patent Document 1) discloses an information recording medium, a write apparatus and a read apparatus, wherein time map information that associates time information about read operation of recorded video data with LBA is generated and stored as a part of management information for managing the read operation of the video data separately from the video data.

Further, Japanese Patent Laid-open No. 2000-149425 (Patent Document 2) discloses a disk drive, wherein an area for writing system data is separated from an area for writing consecutive data having a constant transfer rate and the consecutive data with the addition of time information is written on a disk-like recording medium in the order of addresses in the area for writing the consecutive data.

Still further, because the surveillance data may be important, it must not be tampered. As a system that prevents tampering of the data in a magnetic disk drive in view of this requirement, Japanese Patent Laid-open No. 2002-133770 (Patent Document 3) discloses an AV information write apparatus that has a first head for data write/read operation and a second head for read operation, which are controlled and driven to input/output the data from/to the outside independently of each other, wherein the AV information apparatus gives sector/track numbers to be written/read to each head and has a buffer for the written/read data.

Further, Japanese Patent Laid-open No. 2002-140171 (Patent Document 4) discloses an information processing system using a magnetic disk drive that has a head with security features for data write/read operation and another write/read head, wherein a PC connected to the head with security features is, in turn, connected to an external network.

Still further, Japanese Patent Laid-open No. 2002-251324 discloses a server system and a security system using a magnetic disk drive that has a switch for physically switching between a write/read mode and a read only mode.

BRIEF SUMMARY OF THE INVENTION

Since surveillance data is important data used for identifying criminals when a crime occurs, in a write/read apparatus for surveillance data, it seems to be required that (1) data is input only from a specific device such as a camera at all times and written also at all times, (2) written important data must not be deleted or overwritten (prevention of tampering) and can be read at any time upon request from the reading side, and (3) unimportant data can also be written and read and, as it may be overwritten, recording time can be extended by permitting overwriting of the such unimportant data.

In the case of the tape medium wherein the write/read operations are performed by the sequential access as in the conventional example described above, the tape medium does not have the LBA and cannot be accessed randomly. Therefore, the overwrite of important data cannot be prohibited and, if the important data is written with the addition of an overwrite prohibit flag, the non-overwritable area cannot be skipped immediately in the next write operation and, as a result, a time period in which the data cannot be written will occur. Even if an attempt is made to address this problem by providing a memory for buffering the data during the downtime, there is a problem in that a large-capacity memory is needed to take such measure because the recording time of the important data cannot be predefined and, after all, the recording cannot be guaranteed reliably.

On the other hand, in the case of the optical disk medium, in addition to the limitation on the number of rewrite operations, based on the fact that the optical disk medium is accessed by specifying the LBA and a plurality of data written in a same address have a same LBA, there is a problem in that it is necessary to add management information such as time information besides the LBA in order to detect when each non-overwritable important data or overwritten data has been written and, as a result, the management information becomes larger in size and complicated.

This problem also applies to the conventional magnetic disk drive and the disk drive disclosed in Japanese Patent Laid-open No. 2000-149425, though these disk drives have no limitation on the number of rewrite operations. On the other hand, in the information recording medium disclosed in Japanese Patent Laid-open No. 2002-367341, though the management information that associates the time information about the read operation of video data with the PBA is written on the recording medium, there is a problem in that this management information is not configured to manage the information about the write operation such as the recording time and the prohibition of overwriting of the important information and, therefore, it is not suitable for applications in which the write operation is more important, such as the recording of surveillance data.

Further, in the magnetic disk drives and systems disclosed in Japanese Patent Laid-open No. 2002-133770, Japanese Patent Laid-open No. 2002-140171 and Japanese Patent Laid-open No. 2002-251324 which have a data tampering prevention function, there is a problem in that these drives and systems cannot support the case where the data is written all the times and the non-overwritable data is mixed with the overwritable data.

It is a feature of the present invention to provide a write/read apparatus that can write input digital data continuously and prohibit deletion or overwriting of a certain type of written data.

According to an aspect of the present invention, there is provided a write/read apparatus for writing and reading data on a disk-like rotating recording medium comprising: an external interface section for data input; an external interface section for data output; a memory for temporarily storing the data that is input through the external interface section for data input and written on the recording medium and the data that is read from the recording medium and sent to the outside through the external interface section for data output; an address generating section for generating unique addresses associated with physical block addresses of the recording medium; a flag generating section for generating flags for prohibiting overwriting of the data to be written on the recording medium; and a processing section for adding the unique addresses generated in the address generating section to the data that is stored in the memory and that is to be written on the recording medium, wherein the data with the addition of the flags generated in the flag generating section and the unique addresses is written on the recording medium.

In some embodiments, the recording medium is divided into a plurality of sectors and unique physical block addresses are added to each of the sectors. The data is written on the recording medium sequentially in continuous ascending order of the physical block addresses and, after the sector corresponding to the maximum value of the physical block addresses is written, the sector corresponding to the minimum value is written again.

According to an example, the recording medium is divided into a plurality of sectors and unique physical block addresses are added to each of the sectors. The address generating section generates address values that are an output of an increment counter that increments by one for each sector and can output a value sufficiently larger than the number of all user sectors or a clock that indicates the time when write data is input.

In a preferred example, the flag generating section determines significance of write data, generates the flags based on the determination and adds the flags to the write data.

Further, in a preferred example, the write/read apparatus further has a control section for controlling write and read operations of the data on said recording medium. When the data is written in a certain area of the recording medium, the control section references to the flags of the data that has been written in the area previously and controls to prohibit or permit the overwriting by the data to be written in the area subsequently.

According to the example discussed above, the recording medium is divided into a plurality of sectors and the data is written and read on a sector-by-sector basis. The control section skips the sector of the physical block address flagged as valid to the nearest subsequent sector of the physical block address flagged as invalid to continue the write operation therefrom.

Further, in a preferred example, the write/read apparatus sends a list of the unique addresses and flags for the data written on the recording medium to a host via the external interface section for data output, reads the data having the unique addresses specified by the host via the external interface section for data output from the recording medium, and sends the data to the host via the external interface section for data output.

According to the present invention, the digital data that is input continuously can be written and the overwrite of a certain type of written data can be prohibited. Further, recording time can be extended by permitting overwriting of other type of data. Still further, the write/read apparatus that can read the written data at any time upon request from the host can be implemented.

BRIEF DESCRIPTION OF THE DRAWINGS

FIGS. 5(*a*) and 5(*b*) are diagrams showing flag management tables for overwrite prohibit flags in the magnetic disk drive in an embodiment.

DETAILED DESCRIPTION OF THE INVENTION

Hereinafter, embodiments in which a magnetic disk drive is used as a read/write apparatus having a rotating recording medium will be described with reference to the drawings.

Figure 1:
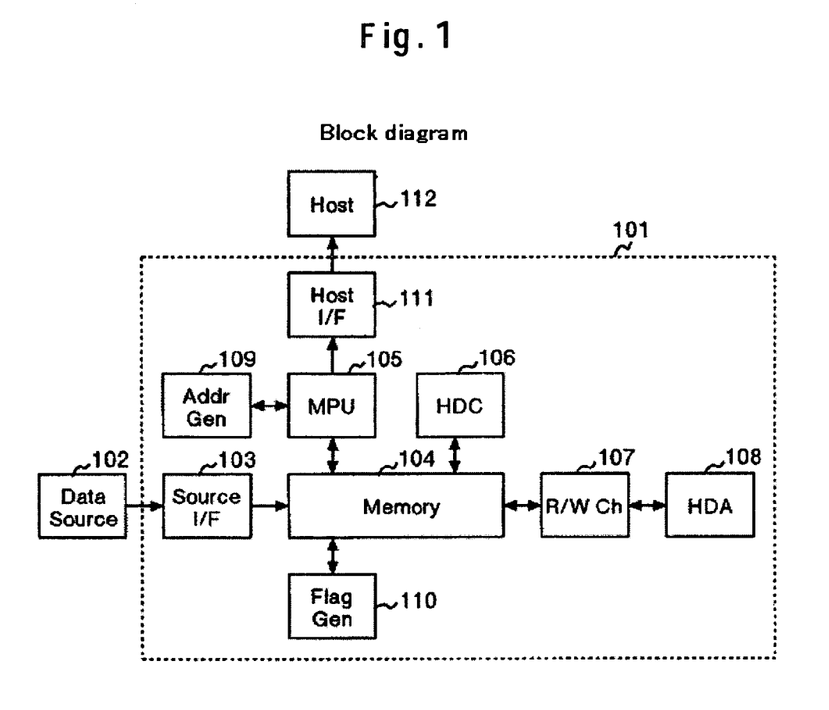
FIG. 1 is a block diagram showing a configuration of a magnetic disk drive in an embodiment.

FIG. 1 is a block diagram of a magnetic disk drive in an embodiment. A magnetic disk drive 101 has two ports, one of which is a write only port and the other of which is a read only port. Thus, it has an external interface section dedicated to data input (a source I/F) 103 that is connected to a data output device (a data source) 102 such as a video camera for outputting digital data, and an external interface section dedicated to data output (a host I/F) 111 that is connected to a host computer (hereinafter simply referred to as a host) 112 for reading data.

Further, the magnetic disk drive 101 comprises components including: a memory 104 that stores firmware, programs and information about various settings of the magnetic disk drive and performs buffering/caching of written/read data; a microprocessor (MPU) 105 that controls data input/output, file management and operations of each unit of the magnetic disk drive 101; a hard disk controller (HDC) 106 that controls write/read data flow to/from a magnetic disk medium, PBA management, error correction, servo positioning and so on; a read/write channel (R/W Ch) 107 that performs signal processing suitable for a magnetic head and the magnetic disk medium; a head disk assembly (HDA) 108 that includes the magnetic head and the magnetic disk medium therein; a unique address generating circuit (Addr Gen) 109 that generates unique addresses corresponding to input data; and an overwrite prohibit flag generating circuit (Flag Gen) 110 that determines the significance of input data.

Hereinafter, data and control flow in the magnetic disk drive 101 when data is written will be described. Digital video data is input from the data source 102 such as the video camera. This digital data consists of a certain unit of data files such as a frame unit in Motion JPEG format or a GOP (Group of Pictures) unit in MPEG format. Further, particular data patterns to indicate the start and end of the data files, identification numbers of the data files, valid signals to indicate that the data files are valid, and so on, are added to this digital data so that separations of the data can be distinguished. The format and unit of the data and the method for distinguishing the separations are not limited to those described above and any means and methods may be used so long as the digital data consists of a certain unit of data files and the separations of the data can be distinguished explicitly.

The external interface section 103 is the write only port that fetches the input data and transfers it to the memory 104 to store it therein. Here, the external interface section 103 is either a non-general-purpose I/F that conforms to the I/F of the output of the data source 102 or a general-purpose I/F for magnetic disks such as ATA and, in the case of the general-purpose I/F, the MPU 105 controls the external interface section 103 so as to accept only write requests and ignore read requests.

The MPU 105 determines data length from address information of the memory 104, calculates the number of sectors required to store the data on the magnetic disk medium, and controls the unique address generating circuit 109. Alternatively, the external interface section 103 may be provided with a circuit for counting the number of bytes of the data simultaneously with the data input to determine the number of sectors required to store the data on the magnetic disk medium and report the result to the MPU 105.

According to the control of the MPU 105, the unique address generating circuit 109 outputs unique addresses by an increment counter, a clock or the like, that increment by one for each sector and that do not conflict with each other and can be sufficiently larger than the number of all user sectors. In other words, the address generating circuit 109 generates address values that are an output of the increment counter that increments by one for each sector and can output a value sufficiently larger than the number of all user sectors or a clock that indicates the time when write data is input.

The MPU 105 adds the unique addresses from the unique address generating circuit 109 to the data sectors stored in the memory 104. On the other hand, concurrently with the generation and addition of the unique addresses, the overwrite prohibit flag generating circuit 110 determines the significance of a given data stored in the memory 104, generates a flag indicating that overwrite is prohibited from the next time, and adds the flag to the data sector. The significance is determined, for example, by comparing the data sector with the immediately preceding one so as to detect the appearance or motion of a person or sudden increase of sound level, or to perform feature extraction of dangerous articles such as a gun and a knife by pattern matching.

Further, when overwrite prohibit flag information is added to the data input from the data source 102 in advance, a register is provided so that the external flag information can be switched to enable or disable and the flag generating function in the overwrite prohibit flag generating circuit 110 can be switched to enable or disable. As soon as the unique addresses and the flags have been added, the MPU 105 instructs the HDC 106 to write the data on the magnetic disk medium.

The HDC 106 manages PBAs and information about defects on the magnetic disk medium and performs servo positioning by allowing the magnetic head in the HDA 108 to seek and follow the position of the PBA that is subsequent to the sector where the last user data has been written and that is not registered as defective. At this time, if the sector is defective, the HDC 106 controls to skip not to the alternate sector of the PBA but to the subsequent non-defective PBA. Further, the HDC 106 determines whether the PBA on the magnetic disk medium for writing the data is overwritable or not by reading the sectors of the PBA and checking the overwrite prohibit flags. In this case, processing time is increased because the sectors of the PBA for writing the data must be read in advance.

However, the processing time can be reduced by registering the non-overwritable PBA in the flag management table that associates the PBA with the flag information, which will be described with reference to FIG. 5 later, at the time of data writing. If any PBA is non-overwritable, the PBA is skipped and the magnetic head is positioned at the subsequent PBA and, then, the PBAs are retrieved repeatedly till all the PBAs for the number of sectors required for writing the data become overwritable. This operation may be performed concurrently with the generation and addition of the unique addresses and the flags so that the processing time can be reduced further. After the PBAs for the required sectors have been secured and the positioning operation has been completed, the data is read from the memory 104, CRC (cyclic redundancy check characters) for checking false correction errors and ECC (error correcting codes) for correcting errors are added thereto, and the data is output to the read/write channel 107.

The read/write channel 107 performs code conversion according to characteristics of the magnetic head and the magnetic disk medium, adds preambles and SB (sync bytes) for indicating the start of the data to each data sector and outputs the data to the HDA 108 so that it is written on the magnetic disk medium in the HDA 108.

Figure 2:
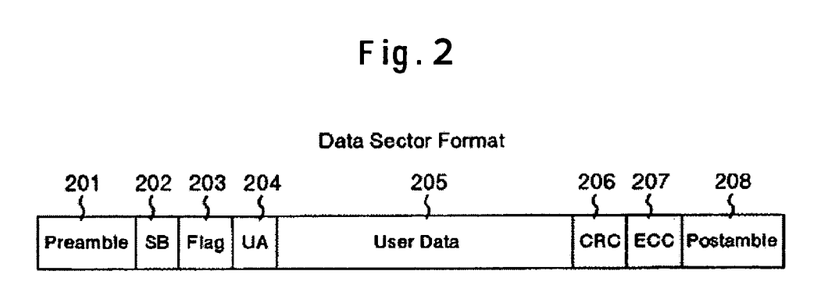
FIG. 2 is a diagram showing a format of a data sector of the magnetic disk drive in an embodiment.

FIG. 2 shows a format of the data sector written on the magnetic disk medium as described above. As shown in FIG. 2, this format is comprised of a preamble 201, a sync byte (SB) 202, a flag 203 that is overwrite prohibit flag information, a unique address (UA) 204, a user data area 205, a CRC 206, an ECC 207, and a postamble 208 that is a margin for absorbing rotational fluctuation of a motor for rotating the magnetic disk medium. Here, the flag 203 and the UA 204 may be replaced with each other.

The CRC 206 is generated from the data from the start of the flag 203 to the end of the user data area 205. On the other hand, the ECC 207 is generated from the data from the start of the flag 203 to the end of the CRC 206. In view of the fact that the flag 203 and the UA 204 are important management data used in writing and reading the data, means for increasing reliability in the read operation, such as multiple writing or addition of parity information for error correction, may be provided.

Figure 3:
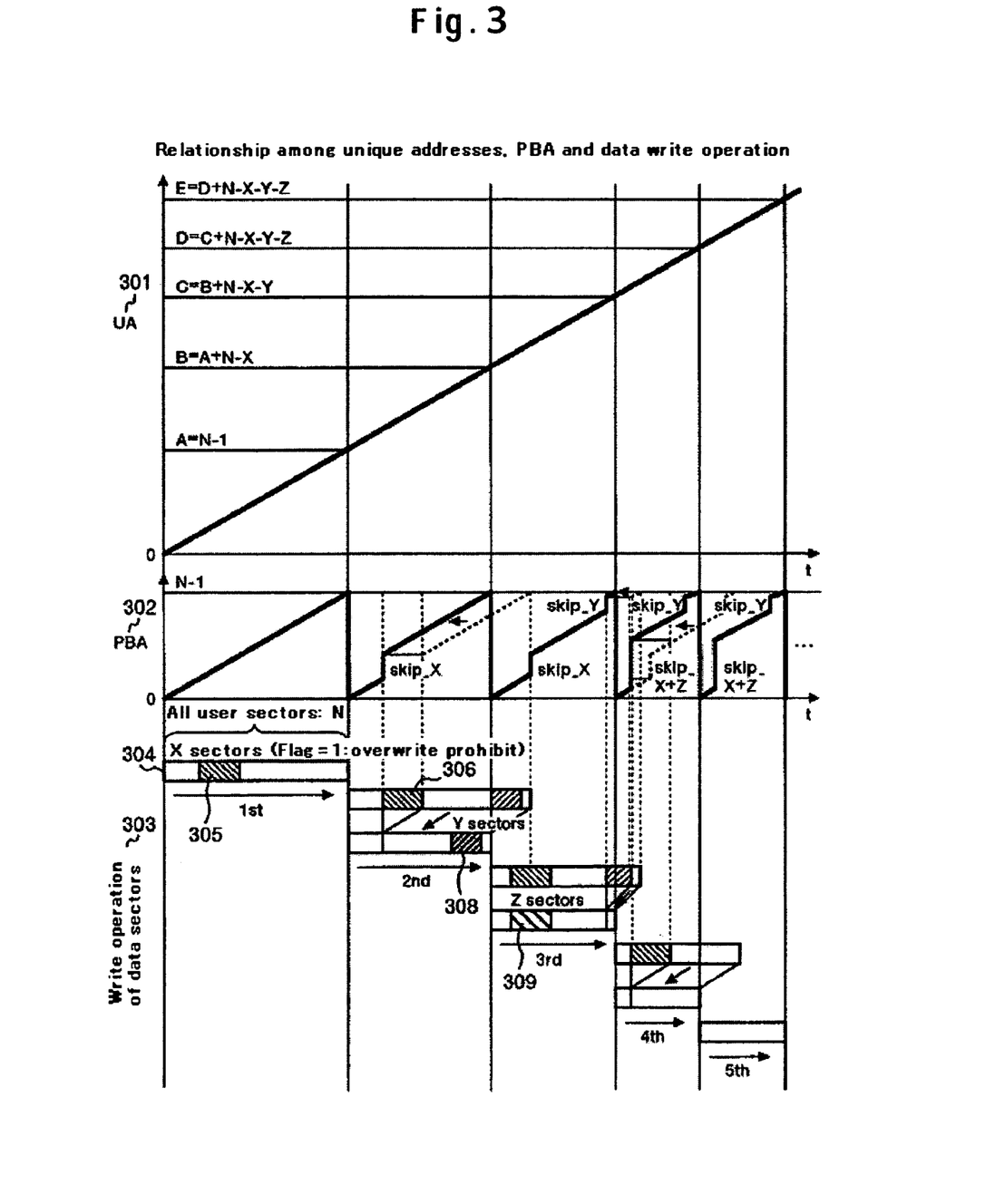
FIG. 3 is a diagram showing a recording status of unique addresses, physical block addresses and data sectors in an embodiment.

FIG. 3 is a conceptual diagram showing the write operation of the unique addresses, the PBAs and the data sectors. UA 301 indicates the unique addresses generated by the increment counter in the unique address generating circuit 109 that increments by one for each sector to be written. Write operation of data sectors 303 indicates how the data is written in user sectors when the number of all user sectors in the magnetic disk drive is assumed to be N. An elongated rectangle enclosed by bold lines 304 indicates writable user sectors and a diagonally shaded area 305 in the rectangle indicates sectors that are determined to be non-overwritable (flag=1) by the overwrite prohibit flag generating circuit 110. 1st, 2nd, 3rd, 4th and 5th indicate the number of times of the write (overwrite) operation.

PBA 302 indicates transition of the PBA corresponding to the write operation of data sectors 303 and the PBA increment by one from 0 (a starting address) to N−1 (a last address) in the first write operation (1st). However, it is to be noted that this figure shows a case in which there is no defective sector. If there are defective sectors, the PBAs corresponding to the defective sectors are skipped and increment discontinuously, but still monotonously. Hereinafter, the status of the write operation will be described in chronological order. In the first write operation (1st), UA 301 increments from an initial value "0" by one every time the sector data is written.

On the other hand, PBA 302 also increments by one from a minimum value "0" of the user data area in which the user data is stored so that the user data is stored in the consecutive sectors. Intermediate X sectors (the diagonally shaded area 305) are flagged as 1 and cannot be overwritten from the next (second) time. After all user sectors have been written, the value of UA 301 is "A=N−1" and the value of PBA 302 is "N−1".

When the next data is input and the second write operation (2nd) is started, the value of UA 301 increments one by one from "N" and the value of PBA 302 increments one by one from "0". If the sectors flagged as 1 are detected in the course of the write operation, PBA 302 skips such sectors to the nearest subsequent sector flagged as 0 (skip_X) to continue the write operation. A diagonally shaded elongated rectangle 306 indicates the writable user sectors on the assumption that the sectors flagged as 1 created in the previous (1st) write operation are not skipped but, in fact, the X sectors are skipped. Further, Y sectors (a diagonally shaded area) 308 are sectors newly flagged as 1 and cannot be overwritten from the next (third) time.

After all user sectors have been written, the value of UA 301 is "B=A+N−X" and the value of PBA 302 is "N−1". Thus, the number of sectors written in the second operation is "N−X" or the number of all sectors excluding the X sectors that have been flagged as 1 in the first write operation (1st). Similarly, when the third write operation (3rd) is started, the value of UA 301 increments one by one from "B+1=2N−X" and the value of PBA 302 increments one by one from "0". If the sectors flagged as 1 are detected in the course of the write operation, PBA 302 skips such sectors to the nearest subsequent sectors flagged as 0 (skip_X and skip_Y) to continue the write operation.

Further, Z sectors (a diagonally shaded area) 309 are sectors newly flagged as 1 and cannot be overwritten from the next (fourth) time. After all user sectors have been written, the value of UA 301 is "C=B+N−X−Y" and the value of PBA 302 is "N−1". Thus, the number of sectors written in the third write operation is "N−X−Y" or the number of all sectors excluding the X sectors and Y sectors that have been flagged as 1 till the second write operation (2nd). Similarly, when the fourth write operation (4th) is started, the value of UA 301 increments one by one from "C+1=3N−2X−Y" and the value of PBA 302 increments one by one from "0". If the sectors flagged as 1 are detected in the course of the write operation, PBA 302 skips such sectors to the nearest subsequent sectors flagged as 0 (skip_X+Z and skip_Y) to continue the write operation.

After all user sectors have been written, the value of UA 301 is "D=C+N−X−Y−Z" and the value of PBA 302 is "N−1". Thus, the number of sectors written in the fourth write operation is "N−X−Y−Z" or the number of all sectors excluding the X sectors, Y sectors and Z sectors that have been flagged as 1 till the third write operation (3rd). Hereinafter, the write operation continues similarly.

Figure 4:
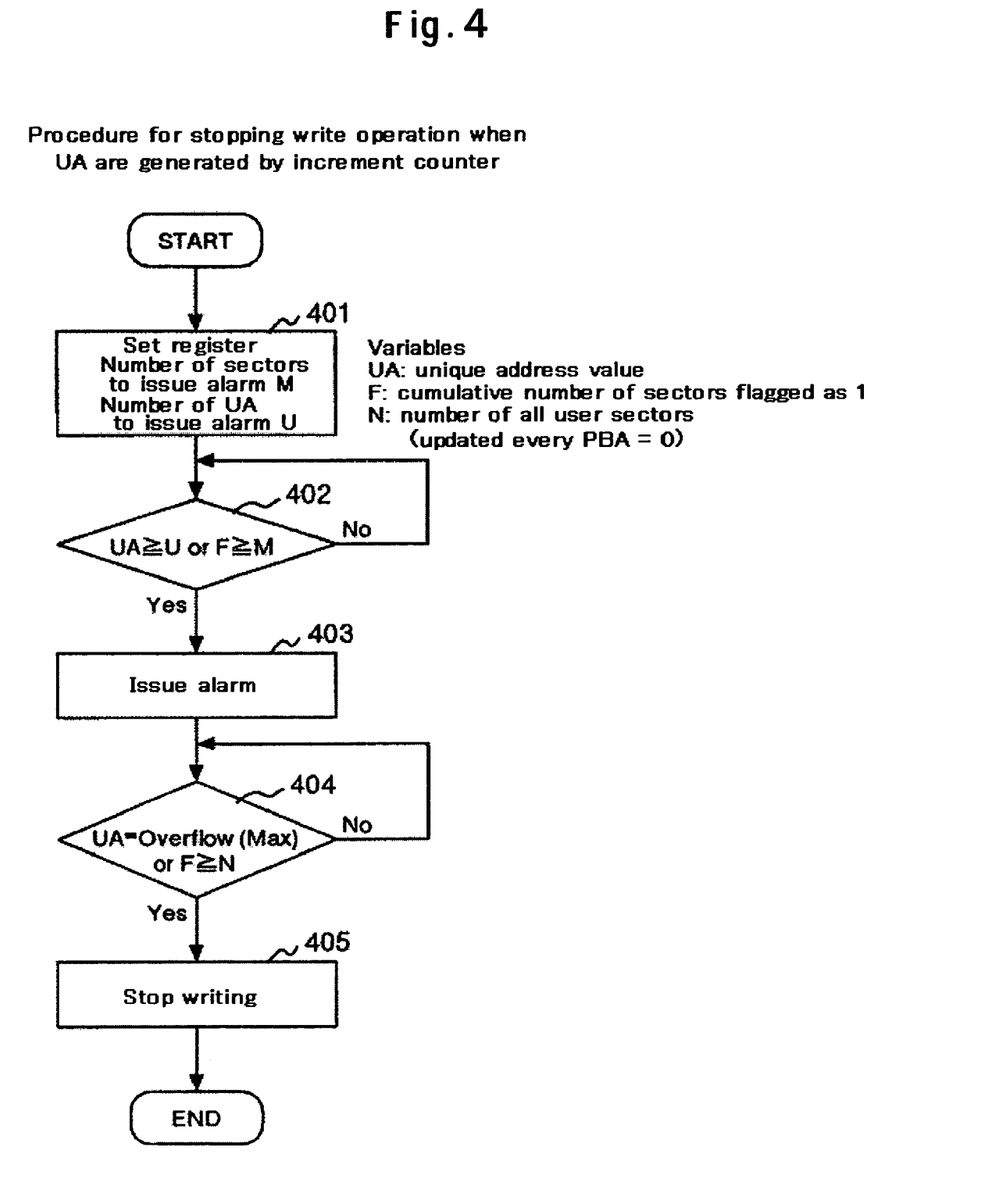
FIG. 4 is a flow chart showing a procedure for stopping a write operation of the magnetic disk drive in an embodiment.

FIG. 4 is a flow chart showing a procedure for stopping the write operation when the unique addresses are generated by the increment counter. As the non-overwritable sectors flagged as 1 are increased, the number of writable sectors is decreased gradually and eventually the write operation becomes impossible. When important data such as surveillance data is written, it cannot be permitted that the data itself has not been written. Therefore, the write/read apparatus is configured so that an alarm is issued when the number of writable sectors becomes less than a threshold value and, after that, the data writing is stopped if it becomes impossible but the data reading is still permitted.

In step 401, the number of sectors M flagged as 1 and the number of unique addresses U to issue the alarm are placed as thresholds into a register. In step 402, if the number of unique addresses UA to be written is equal to or more than U or if the cumulative number F of the sectors flagged as 1 is equal to or larger than M, the process proceeds to step 403 to issue the alarm. The alarm may be given, for example, by lighting an LED, outputting alarm data to the host computer (host) 112 that reads the data, or sounding a beep. When the alarm is issued, a system administrator or user can prevent interruption of the write operation by adding another magnetic disk drive 101 and changing the destination of the write data thereto.

In step 404, the data is written continuously and, if the increment counter for generating the unique addresses overflows or if the cumulative number of the sectors flagged as 1 is equal to or larger than the number of all user sectors N, the process proceeds to step 405 to stop the data writing and permit the data reading only. In this connection, if the unique addresses are generated by time information from the clock, the unique addresses should not be included in the condition to issue the alarm and stop the write operation and the condition should be F≧M in step 402 and F≧N in step 404. Alternatively, the time information may be used as the condition to issue the alarm and stop the write operation. Further, after all user sectors have become non-overwritable and all data has been saved by backup and the like, for users who wish to reuse the magnetic disk drive, the magnetic disk drive may be provided with a function to format the magnetic disk by a secret command specified by the manufacturer of the magnetic disk drive. Though the magnetic disk drive can be reused by formatting so that the unique addresses return to the initial value "0", there is a possibility of destruction of evidence in this case and, therefore, any operational measure such as to format the magnetic disk drive in the presence of a third party institution may be necessary.

FIGS. 5(a) and 5(b) are diagrams showing flag management tables for the flags indicating the non-overwritable sectors. The flag information is written on the magnetic disk medium with data according to the format shown in FIG. 2. In order to overwrite a given sector in the write operation, it is necessary to read the sector once and check that the sector is non-overwritable (flag=0), which is a time consuming task. Therefore, in the write operation, it is desirable to store the flag information in the memory 104 and reference to the flag information and update it so as to accelerate the overwrite operation.

FIG. 5(a) is a mapping information table in which there is a one-to-one correspondence between the PBA and the 1-bit flags. For example, in the case of a magnetic disk drive which has a storage capacity of 400 GB and each sector of which has a data length of 512 bytes, a table space of about 782 Mbit is needed. The table space is increased as the storage capacity is increased and, on the other hand, is reduced as the data length of each sector is increased.

FIG. 5(b) is a flag management table that stores pairs of the first PBA of the data flagged as 1 and the number of the consecutive data sectors when the large-sized data is stored in the consecutive data sectors flagged as 1. As the size of one data set is increased, the necessary table space is reduced. These flag management tables are stored in non-volatile memory. Though the non-volatile memory such as flash memory can be rewritten only a limited number of times, it is not a problem because the flag management table is basically rewritten only once from flag=0 to flag=1. When the flag management table is stored in the non-volatile memory, it is not always necessary to record the flag information added to the sectors on the magnetic disk medium. Volatile memory may be used to store the flag information but, in this case, the flag management table is available only after all user sectors are read and the flag information is stored in the memory upon power-up of the magnetic disk drive and, therefore, starting time becomes longer.

As described above, the magnetic disk drive that can output and record digital data while the data source 102 does not access the LBA can be attained. Further, because the magnetic disk drive is provided with the unique address generating circuit therein and the unique addresses are added to the data so that a time relationship in the write operation can be determined based on the unique addresses, it is not necessary to provide time information besides the LBA and, therefore, management information can be reduced. Still further, the magnetic disk drive has the detection and overwrite prohibit flag generating circuit that detects important data so as to reference to the flag information and prohibit overwriting from the next time, the important data can be protected and, at the same time, long-time recording can be implemented by overwriting other data.

Next, a data and control flow in the magnetic disk drive 101 when the data is read will be described with reference to FIG. 1. When the host 112 wishes to read data in the magnetic disk drive 101, it outputs a data list read request. Though the host I/F 111 is an external interface section dedicated to data output, it can receive the command and output to the MPU 105. Here, the host I/F 111 is a general-purpose I/F for a magnetic disk (ATA, SCSI and the like) or a network (Ethernet (trade mark) and the like) that conforms to the I/F of the input/output of the host 112. The MPU 105 ignores the input command when it is a data write request and, on the other hand, issues a command to read a list of all data sectors to the HDC 106 when the input command is a data read request. The HDC 106 performs servo positioning by allowing the magnetic head in the HDA 108 to seek and follow the position of the first PBA "0" of all the data sectors. After the positioning is completed, the sector data is read sequentially from the PBA "0". An analog signal waveform of the sectors read from the HDA 108 is processed and discriminated in the read/write channel 107 to detect the SB 202 so that the digital data is reproduced and output to the memory 104.

The HDC 106 performs error correction by ECC and detection of false correction errors by CRC for the sector data in the memory 104. HDC 106 continues the process from the data read from the HDA 108 to the error correction/detection for a series of PBA sequentially. In this connection, when the flags 203 and the UA 204 are written in a multiple manner or when parity information for error correction is added, the ECC/CRC processes may be omitted to reduce processing time and, instead, reliability of the information of the flags 203 and the UA 204 may be secured by majority operation of the flags and the UA, error detection using the parity information, estimation based on the information from the flags and UA read from the PBA before and after the given sector, and so on.

Further, when the false correction errors detected by the CRC disappear after the sectors flagged as 1 have been reread several times, the data including such sectors may be rewritten in consecutive sectors flagged as 0 and, at the same time, the flag management table may be updated and the defective sectors may be registered. After that, the MPU 105 reads the flags 203 and the UA 204 from the memory 104 in the order of the PBA, determines separation of the data based on continuity of the UA and coincidence of the flags and, then, outputs the UA and flag at the start of each data to the host I/F 111. At this time, when the UA are generated by the increment counter in the unique address generating circuit 109 and the data is written every predetermined time period, the MPU 105 may present the UA converted to an elapsed time after startup or time difference from the present time.

As described above, the host 112 can obtain the data list written in the magnetic disk drive 101. The user selects the starting UA of the data he or she wishes to read from the list of the UA and flags presented via the host 112. The host 112 outputs a data read request that specifies the selected UA and corresponding flag information. The host I/F 111 outputs the input read command and the flag information to the MPU 105. The MPU 105 accepts this data read command. Then, when all sectors of the data having the specified UA as its starting sector are cached in the memory 104, these sectors are read from the memory 104 and output to the host 112. On the other hand, when these sectors are not cached in the memory 104, the HDC 106 is instructed to read the data of the specified UA with the flag information.

Figure 5:
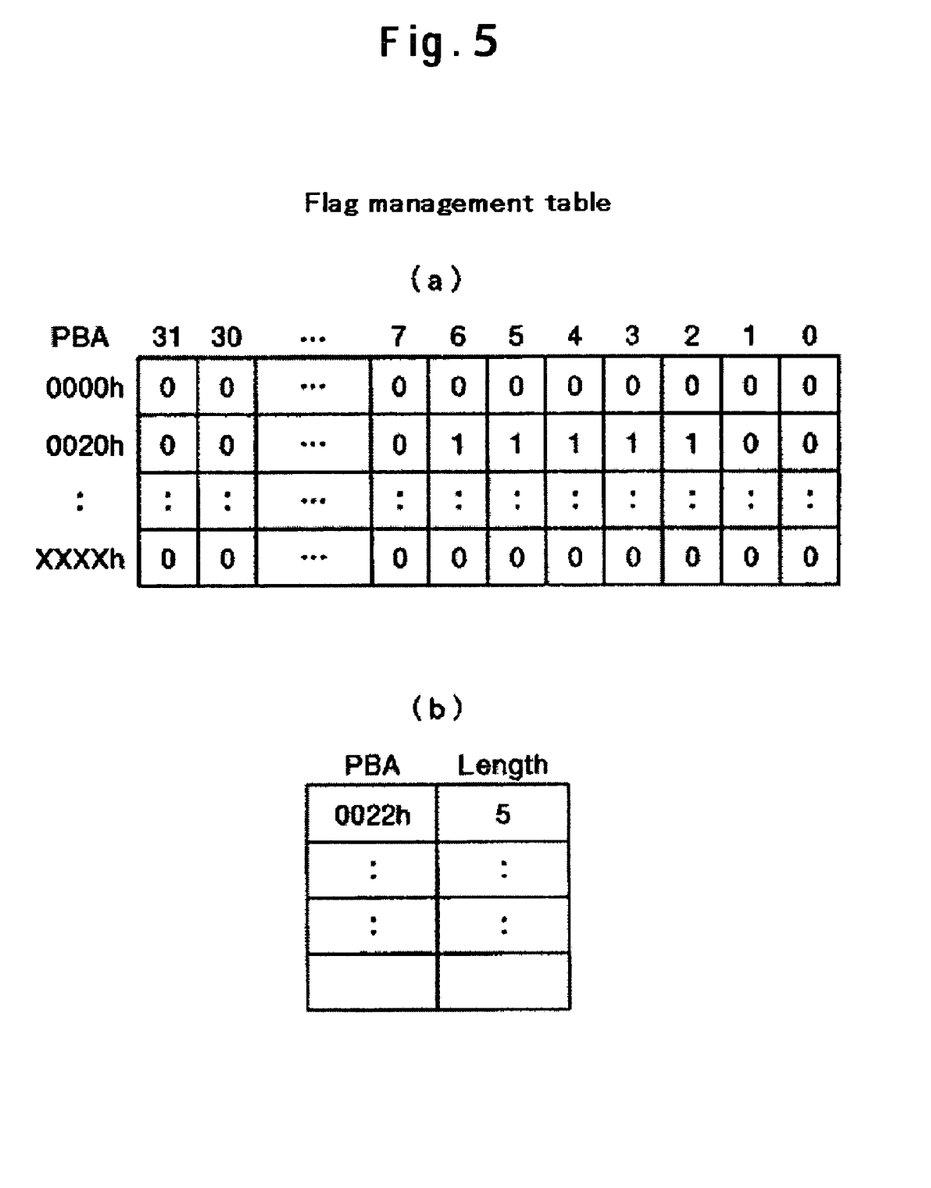

If the flag=1, the HDC 106 specifies the registered PBA flagged as 1 by making reference to the flag management table shown in FIG. 5, positions the magnetic head in the HDA 108, reads the sector of the specified PBA, performs signal processing and data discrimination in the read/write channel 107, stores the data in the memory 104 and performs the ECC/CRC check and, then, repeats the above operation for a series of PBAs sequentially. On the other hand, if the UA flagged as 0 is specified, the HDC 106 repeats the data read operation described above for the PBA except those flagged as 1 from the minimum PBA sequentially by making reference to the flag management table. The MPU 105 read the UA of the data stored in the memory 104 and, if the UA coincides with the specified one, determines separation of the data based on continuity of the UA and outputs the data to the host I/F 111.

As described above, the host 112 can read the data that the user desires from the magnetic disk drive 101.

In this connection, the magnetic disk drive 101 has two paths, the one of which is the external interface section 103 acting as the write only port and the other of which is the host I/F 111 acting as the read only port, and each of which operates independently and simultaneously. Therefore, the memory 104 has a write pointer and a read pointer and controls them independently. Further, the memory 104 has a sufficiently large capacity to store the write data and the read data input simultaneously. In the read operation, if unimportant data flagged as 0 is specified to be read by UA after the data list consisting of the UA and flags has been presented, such data may be overwritten and may not exist and, in this case, it may be reported not to exist. However, it is not an important problem because important data flagged as 1 is never overwritten and continues to exist and to be readable without fail.

As described above, according to this embodiment, the magnetic disk drive that can write input digital data at all times, prohibit overwriting of written important data to prevent tampering, and read the data at any time upon request from the host can be implemented.

Further, because the magnetic disk drive is provided with the unique address generating circuit therein and the unique addresses are added to the data so that a time relationship in the write operation can be determined based on the unique addresses, it is not necessary to provide time information besides the LBA and, therefore, management information can be reduced. Moreover, unimportant data can also be written and read, and such unimportant data can be overwritten to extend recording time. As a result, a write/read apparatus for a data logger that is preferable to write and read surveillance data can be obtained.

In this connection, the present invention is not limited to the embodiments described above and it may be embodied with various changes so long as the write/read apparatus is provided with two I/F, one of which is a write only port and the other of which is a read only port, and it has a function for generating unique addresses and a function for determining significance of data and generating flags. Further, it is to be understood that the present invention is not limited to magnetic disk drives and it may also be applied to other write/read apparatus having a rotating recording medium.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A write/read apparatus for writing and reading data on a disk-like rotating recording medium comprising:

an external interface section for data input; an external interface section for data output;

a memory for temporarily storing data that is input through said external interface section for data input and written on said recording medium and data that is read from said recording medium and sent outside the write/read apparatus through said external interface section for data output;

an address generating section configured to generate unique addresses associated with physical block addresses of said recording medium;

a flag generating section configured to generate flags for prohibiting overwriting of data to be written on said recording medium; and a processing section configured to add the unique addresses generated in said address generating section to corresponding data that is stored in said memory and that is to be written on said recording medium, wherein data with the addition of the flags generated in said flag generating section and the unique addresses is written on said recording medium;

wherein said flag generating section automatically determines significance of write data, generates the flags based on the determination and adds the flags to the write data; and wherein the write/read apparatus sends a list of the unique addresses and flags for data written on said recording medium to a host via said external interface section for data output, reads data having the unique addresses specified by said host via said external interface section for data output from said recording medium, and sends read data to said host via said external interface section for data output.

2. The write/read apparatus according to claim 1, wherein said recording medium is divided into a plurality of sectors and unique physical block addresses are added to each of the sectors, and data is written on said recording medium sequentially in continuous ascending order of the physical block addresses and, after a sector corresponding to a maximum value of the physical block addresses is written, a sector corresponding to a minimum value is written again.

3. The write/read apparatus according to claim 1, wherein said recording medium is divided into a plurality of sectors and unique physical block addresses are added to each of the sectors, wherein said address generating section generates address values that are either: (1) an output of an increment counter that increments by one for each sector and can output a value sufficiently larger than the number of all user sectors or (2) a clock that indicates the time when write data is input.

4. The write/read apparatus according to claim 1, further comprising a control section configured to control write and read operations of data on said recording medium, wherein, when data is written in a certain area of said recording medium, said control section references the flags of data that have been written in the certain area previously and controls to prohibit or permit the overwriting by data to be written in the certain area subsequently.

5. The write/read apparatus according to claim 4, wherein said recording medium is divided into a plurality of sectors, data is written and read on a sector-by-sector basis, and said control section skips a sector of the physical block address flagged as valid to a nearest subsequent sector of the physical block address flagged as invalid to continue write operations therefrom.

6. The write/read apparatus according to claim 1, wherein said memory for data written on said recording medium has a write pointer and a read pointer that are controlled independently and said memory has a sufficiently large capacity to store data written and read to/from said recording medium simultaneously.

7. The write/read apparatus according to claim 1, wherein said recording medium is divided into a plurality of sectors, and thresholds V1 and V2 are placed into respective registers so that an alarm is issued when either: (1) an amount of unique addresses is equal to or more than V1 or (2) the number of sectors flagged as valid is equal to or more than V2.

8. The write/read apparatus according to claim 7, wherein a threshold V3 (V1<V3) is placed into a register so that write operation of data to said recording medium is prohibited when the amount of the unique addresses is equal to or more than V3 or the number of sectors flagged as valid is equal to or more than the number of all user sectors.

9. A write/read method for writing and reading data on a disk-like rotating recording medium, comprising:

generating unique addresses in relation to a write operation of data in a certain recording area of said recording medium;

generating flags;

determining automatically the value of flags corresponding to data previously written in the certain recording area when input data received from an external interface for data input is to be written in the certain recording area of said recording medium;

adding the generated flags and the generated unique addresses to the input data to be written and writing the data with the flags and unique addresses in the certain recording area of said recording medium when, as a result of the determining, the value of the flags of the previously written data indicates that overwriting is permitted;

not writing the data in to the certain recording area according to the value of the flags as a result of said determining indicating that overwriting is prohibited and, thereafter, writing the data in another recording area according to consecutive unique addresses when a recording area whose flags permit the write operation is reached;

sending a list of unique addresses and flags in relation to data written on said recording medium to a host via an external interface section for data output; and reading data having the unique addresses specified by said host via said external interface section for data output from said recording medium and sending read data to said host via said external interface section for data output.

10. The write/read method according to claim 9, further comprising determining significance of data when data is written on said recording medium,
wherein, as a result of said determining, data showing a certain level of significance is provided with respective flags indicating that a subsequent overwrite operation of data is prohibited.

11. A write/read method for writing and reading data on a disk-like rotating recording medium, comprising:
generating unique addresses in relation to a write operation of data in a recording area of said recording medium;
writing a certain type of data input via an external interface section for data input in the recording area of said recording medium with the addition of flags to prohibit an overwrite operation and the unique addresses in a first recording mode;
writing another type of data input via an external interface section for data input in the recording area of said recording medium with the addition of flags to permit an overwrite operation and the unique addresses in a second recording mode;
determining, automatically, the value of the flags of data previously written in the recording area when input data is to be written in the recording area of said recording medium and, then, permitting the write operation in either the first recording mode or the second recording mode when the flags of the previously written data overwrite operation is permitted;
determining the value of the flags of the data previously written in the recording area when input data is to be written in the recording area of said recording medium and, then, skipping the recording area when the overwrite operation is not permitted and, thereafter, writing the data according to consecutive unique addresses in either the first or second mode when another recording area where the write operation is permitted is reached;
determining significance of the input data when data is to be written on said recording medium, wherein, as a result of said determining significance, data showing a certain level of significance is provided with flag values indicating that a subsequent overwrite operation of data is prohibited;
sending a list of unique addresses and flags in relation to data written on said recording medium to a host via an external interface section for data output; and
reading data having the unique addresses specified by said host via said external interface section for data output from said recording medium and sending data to said host via said external interface section for data output.

* * * * *